US009111396B2

(12) United States Patent
Xie et al.

(10) Patent No.: US 9,111,396 B2
(45) Date of Patent: Aug. 18, 2015

(54) PAGE PROOFREADING METHOD AND APPARATUS

(71) Applicants: PEKING UNIVERSITY FOUNDER GROUP CO., LTD., Beijing (CN); BEIJING FOUNDER ELECTRONICS CO., LTD., Beijing (CN)

(72) Inventors: Qianqian Xie, Beijing (CN); Shaokun Shi, Beijing (CN); Jia Li, Beijing (CN)

(73) Assignees: PEKING UNIVERSITY FOUNDER GROUP CO., LTD., Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 72 days.

(21) Appl. No.: 14/093,771

(22) Filed: Dec. 2, 2013

(65) Prior Publication Data

US 2014/0193044 A1 Jul. 10, 2014

(30) Foreign Application Priority Data

Jan. 9, 2013 (CN) .......................... 2013 1 0008693

(51) Int. Cl.
G06K 9/00 (2006.01)
G06T 11/60 (2006.01)
G06F 17/21 (2006.01)

(52) U.S. Cl.
CPC ................ *G06T 11/60* (2013.01); *G06F 17/21* (2013.01)

(58) Field of Classification Search
USPC ......................................................... 382/112
See application file for complete search history.

(56) References Cited

U.S. PATENT DOCUMENTS

2005/0071757 A1* 3/2005 Ehrich et al. .................. 715/513
2007/0233692 A1* 10/2007 Lisa et al. ...................... 707/10

* cited by examiner

*Primary Examiner* — Gregory F Cunningham
(74) *Attorney, Agent, or Firm* — Hamre, Schumann, Mueller & Larson, P.C.

(57) ABSTRACT

The present invention discloses a method and apparatus for page proofreading, the method comprising: splitting a document before modification to at least one single page document file before modification and splitting a document after modification to at least one single page document file after modification; adding the at least one single page document before modification into a first page, adding the at least one single page document after modification into a second page; setting correlativity between each of the single page documents before modification in the first page and each of the single page documents after modification in the second page; comparing pixel elements of the previews of the single page document before modification and the single page document after modification for all of the first pages and the second pages that correlated with each other; if there are different parts, displaying the comparison result by marking the different parts.

13 Claims, 4 Drawing Sheets

PAGE PROOFREADING METHOD AND APPARATUS

TECHNICAL FIELD

The present invention relates to printing field, especially relates to a page proofreading method and apparatus.

BACKGROUND

Before typesetting and printing, a typesetter needs to proofread the printed matter repeatedly, especially while printing newspapers and books, the typesetter needs to update and modify their contents continually. And because at each time, the modification made to the information can be only identified artificially while typesetting, this process will consume a lot of manpower and material resources, and because of comparing the content currently modified with that of last time modified is not easy for a human being, the entire proofreading process is not efficient.

Nowadays, in order to increase proofreading efficiency and reduce human errors, such that increase production efficiency, Portable Document Format (PDF for short) comparing tools are developed to proofread PDF documents. But some of the existing PDF comparing tools do not have obvious effects to the scanned PDF documents or pictures; even fail to obtain comparing result. Besides, in generally, the existing PDF comparing tools can only compare the documents according to the order of PDF pages, therefore, it is usually difficult to compare the page 1 and the page 100 of two PDF documents respectively to each other, therefore, manual intervention is needed in comparing in such situation, which reduces the comparison efficiency. Besides, the existing document comparing tools cannot replace a document page that with mistakes with a correct document page.

SUMMARY

The embodiment of the present invention provides a page proofreading method and apparatus, can increase comparison efficiency on comparing document pages, also can replace a document page that with mistakes with a correct document page.

To achieve above-mentioned goals, the embodiment of the present invention adopted the following technical solutions:

In the first aspect, a page proofreading method is provided, comprising:

Splitting a document before modification to at least one single page document file before modification, splitting a document after modification to at least one single page document file after modification, each of the single page document files before modification contains: a single page document before modification and a corresponding preview thereof, each of the single page document files after modification contains: a single page document after modification and a corresponding preview thereof;

Adding the at least one single page document before modification into a first page, adding the at least one single page document after modification into a second page;

Setting correlativity between each of the single page documents before modification in the first page and each of the single page documents after modification in the second page;

Comparing pixel elements of the previews of the single page document before modification in the first page and the single page document after modification in the second page that correlated with each other for all of the first pages and the second pages, each of the pixel elements including a pixel value and a gray value of the pixel;

If there are different parts between the single page document before modification and the single page document after modification, displaying the comparison result by marking the different parts.

In the first available implementation, according to the first aspect, the method further comprising: when the comparison result shows that there are different parts between the single page document before modification and the single page document after modification, replacing the single page document before modification with the single page document after modification.

In a second available implementation, combined with the first aspect or the first available implementation, the step of setting the correlativity between each of the single page documents before modification in the first page and each of the single page documents after modification in the second page further comprising:

Correlating a sequence of adding the at least one single page document before modification into the first page with an sequence of adding the at least one single page document after modification into the second page, and setting the correlativity between each of the single page documents before modification in the first page and each of the single page documents after modification in the second page;

Or,

Sorting the at least one single page document before modification in the first page and the at least one single page document after modification in the second page;

Correlating an sequence of the at least one single page document before modification in the first page after movement with an sequence of the at least one single page document after modification in the second page after movement, and setting the correlativity between each of the single page documents before modification in the first page and each of the single page documents after modification in the second page.

In a third available implementation, combined with the first aspect or the first available implementation, the step of comparing pixel elements of the previews of the single page document before modification in the first page and the single page document after modification in the second page that correlated with each other for all of the first pages and the second pages, further comprising:

Determining comparing areas in the previews of the single page document before modification and the single page document after modification that have been correlated according to the correlativity;

Dividing the comparing areas in the previews of the single page document before modification and the single page document after modification into area blocks in the form of array, each area block has the same size;

Comparing gray values for each pixel in the area blocks that are in the same location in the single page document before modification and the single page document after modification, and recording the area blocks that have pixels having different gray values.

In a fourth available implementation, according to the third available implementation, the step of determining the comparing areas in the previews of the single page document before modification and the single page document after modification that have been correlated according to the correlativity, further comprising:

Comparing pixel values of the previews of the single page document before modification and the single page document after modification that have been correlated according to the correlativity;

If the pixel values of the previews of the single page document before modification and the single page document after modification are the same, setting the whole areas of the previews of the single page document before modification and the single page document after modification as the comparing areas;

If the pixel values of the previews of the single page document before modification and the single page document after modification are not the same, setting the whole areas of the previews having a smaller pixel value and areas, which have pixel coordinates corresponding to those of the previews having the smaller pixel value, in the previews having a larger pixel value as the comparing areas.

In the fifth available implementation, according to the third available implementation, the step of dividing the comparing areas in the previews of the single page document before modification and the single page document after modification into area blocks in the form of array, each area block has the same size further comprising:

For the single page document before modification and the single page document after modification, adding a blank pixel area with a preset width into one side in length direction and/or one side in width direction of the comparing area in the preview, to form a new comparing area.

Dividing the new comparing area into area blocks in the form of array, each area block has the same size.

In a second aspect, the embodiment of the present invention provides a page proofreading apparatus, comprising:

A split unit, configured to split a document before modification to at least one single page document file before modification, split a document after modification to at least one single page document file after modification, each of the single page document files before modification contains: a single page document before modification and a corresponding preview thereof, each of the single page document files after modification contains: a single page document after modification and a corresponding preview thereof;

A storage unit, configured to add the at least one single page document before modification split by the split unit into a first page, add the at least one single page document after modification split by the split unit into a second page;

A correlating unit, configured to set correlativity between each of the single page documents before modification that is stored in the first page by the storage unit and each of the single page documents after modification that is stored in the second page by the storage unit;

A comparing unit, configured to compare pixel elements of the previews of the single page document before modification and the single page document after modification that have the correlativity set by the correlating unit for all of the first pages and the second pages, the pixel element including a pixel value and a gray value of the pixel;

A display unit, if there are different parts between the single page document before modification and the single page document after modification, configured to display the comparison result by marking the different parts.

In the first available implementation, according to the second aspect, the apparatus further comprising:

A replacing unit, if the comparison result obtained by the comparing unit is that there are different parts between the single page document before modification and the single page document after modification, configured to replace the single page document before modification with the single page document after modification.

In the second available implementation, combined with the second aspect or the first available implementation, the correlating unit is specifically configured to correlate a sequence of adding the at least one single page document before modification into the first page by the storage unit with a sequence of adding the at least one single page document after modification into the second page by the storage unit, and set the correlativity between each of the single page documents before modification stored in the first page by the storage unit and each of the single page documents after modification stored in the second page by the storage unit;

Or,

Configured to sort the at least one single page document before modification stored in the first page by the storage unit and the at least one single page document after modification stored in the second page by the storage unit; correlate the sequence of the at least one single page document before modification in the first page after movement with the sequence of the at least one single page document after modification in the second page after movement and set the correlativity between each of the single page documents before modification stored in the first page by the storage unit and each of the single page documents after modification stored in the second page by the storage unit.

In the third available implementation, combined with the first aspect or the first available implementation, the comparing unit comprising:

An area determining module, configured to determine comparing areas in the previews of the single page document before modification and the single page document after modification that have been correlated according to the correlativity set by the correlating unit;

An area dividing module, configured to divide the comparing areas, which are determined by the area determining module, in the previews of the single page document before modification and the single page document after modification into area blocks in the form of array, each area block has the same size;

An area comparing module, for the area blocks that are in the same location in the single page document before modification and the single page document after modification, configured to compare gray values for each pixel in the area blocks, and record the area blocks that have pixels having different gray values, wherein the area blocks are divided by the area dividing module.

In the fourth available implementation, according to the third available implementation, the area determining module further comprising:

A pixel value comparing sub-module, configured to compare pixel values of the previews of the single page document before modification and the single page document after modification, wherein the single page document before modification and the single page document after modification are correlated according to the correlativity set by the correlating unit;

An area setting sub-module, if the pixel values of the previews of the single page document before modification and the single page document after modification are the same, configured to set the whole areas of the previews of the single page document before modification and the single page document after modification as the comparing areas; also, if the pixel values of the previews of the single page document before modification and the single page document after modification are not the same, configured to set the whole areas of the previews having a smaller pixel value and the areas, which have the pixel coordinates corresponding to those of the previews having the smaller pixel value, in the previews having a larger pixel value as the comparing areas.

In the fifth available implementation, according to the third available implementation, the area dividing module further comprising:

A new area forming sub-module, for the single page document before modification and the single page document after modification, configured to add a blank pixel area with a preset width to one side in length direction and/or one side in width direction of the comparing area in the preview, to form a new comparing area, wherein the comparing area is determined by the area determining module;

An area dividing sub-module, configured to divide the new comparing area formed by the new area forming sub-module into area blocks in the form of array, each area block has the same size.

The page proofreading method and apparatus provided by the embodiment of the present invention can compare the difference between the correlated single page document before modification page and single page document after modification page according to the pixel values of the pixels, gray values of the pixels and pixel coordinates, thus to avoid manual operations, increase comparing efficiency of comparing the document pages, which also can replace the content in single page document before modification page with a corresponding different content in a single page document after modification page.

BRIEF DESCRIPTION OF THE DRAWINGS

In order to illustrate the embodiment of the present invention or the technical solution of the prior art more clearly, the figures that used to descript the embodiment or the prior art will be introduced briefly, obviously, the figures in the following description are just illustrating some embodiments of the present invention, to those ordinary skilled in the art, other figures can be obtained according to these figures without creative work.

DETAILED DESCRIPTION

Figure 1:
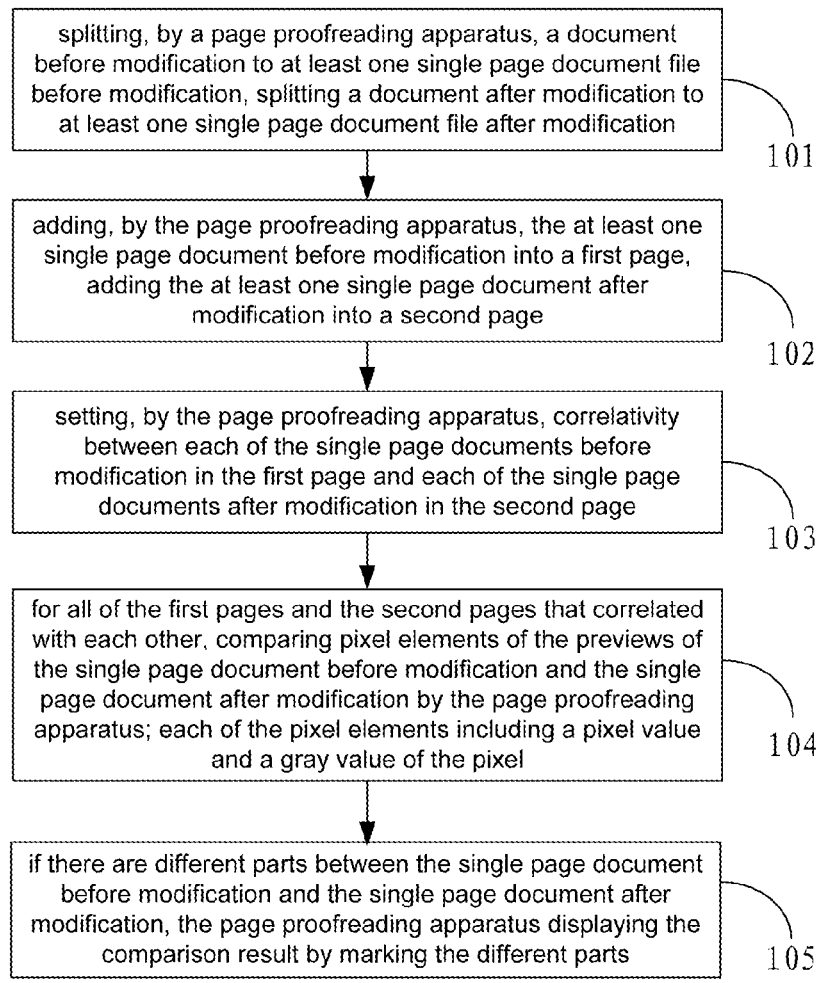
FIG. 1 illustrates a page proofreading method according to embodiment of the present invention.

The technical solution of the embodiment according to the present invention will be described clearly and completely combined with the figures of the embodiment of the present invention in the following; obviously, the described embodiments are only a part of the embodiments of the present invention, but all the embodiments. All of the other embodiments that gained by those ordinary skill people in the art based on the embodiments of the present invention without creative work, are belonging to the protection scope of the present invention.

In typesetting and printing, the typesetter needs to proofread the content of the printed matter repeatedly, because a lot of manpower and material resources are consumed during this process and visual errors exist in human body, errors often occur in the proofreading procedure. Thus PDF document comparing tools are developed to support comparing the characters in the PDF document, but some existing PDF document comparing tools cannot compare the PDF document that in the form of picture, neither can replace the content of document page with mistakes which is compared to be different with the content of the correct document page, in order to fast and efficiently proceeding with error detecting and replacing to these two PDF document pages, the embodiment of the present invention provides a page proofreading method and apparatus, wherein the specific implementation of the page proofreading method is shown below, the method comprising following steps:

101, a page proofreading apparatus splits the document before modification to at least one single page document file before modification, splits the document after modification to at least one single page document file after modification.

Each single page document file before modification contains: a single page document before modification and a corresponding preview thereof, each single page document file after modification contains: a single page document after modification and a corresponding preview thereof.

Step 101, preprocessing the document before modification and the document after modification that will be proofread, wherein, splitting the document before modification and the document after modification, to generate a single page document and a corresponding preview thereof, which has a certain resolution ratio, separately, so as to proceed with the comparing process later. The aforesaid document can be a single page document or a multiple pages document, the document contains character information or picture information, and the aforesaid document should be in the format of the document formats that can generate a preview, including but not limited to, such as, CAJ (China Academic Journals), KDH (reading format of a electronic journal) or PDF (Portable Document Format), etc.

102, the page proofreading apparatus adds the at least one single page document before modification into the first page, adds the at least one single page document after modification into the second page.

103, the page proofreading apparatus sets the correlativity between each of the single page documents before modification in the first page and each of the single page documents after modification in the second page.

Alternatively, step 203 further comprising:

103a, the page proofreading apparatus correlates the sequence of adding the at least one single page document before modification into the first page with the sequence of adding the at least one single page document after modification into the second page, and sets the correlativity between each of the single page documents before modification in the first page and each of the single page documents after modification in the second page.

Or,

103b, the page proofreading apparatus sorts the at least one single page document before modification in the first page and the at least one single page document after modification in the second page; correlates the sequence of the at least one single page document before modification in the first page after movement with the sequence of the at least one single page document after modification in the second page after movement, and sets the correlativity between each of the single page documents before modification in the first page and each of the single page documents after modification in the second page.

In addition, a user also can manually correlate the at least one single page document before modification in the first page and the at least one single page document after modification in the second page. Firstly, cancels the original default correlativity, manually moves the location of the at least one single page document before modification in the first page and the at least one single page document after modification in the second page discretionarily, determines the sequence for the subsequent comparison, proceeds with a one-to-one correlating to the single page documents before modification and single page documents after modification successively according to the determined sequences.

Specifically, the correlativity in step 103a is the default correlativity of the page proofreading apparatus, the correlativity is correlated according to the sequence of adding the at least one single page document before modification into the first page and the sequence of adding the at least one single page document after modification into the second page, that is, proceeds with one-to-one correlating to the single page document before modification and the single page document after modification according to the sequence of saving them.

The method to adjust the correlativity in step 103b can be understood as sorting the at least one single page document before modification in the first page and the at least one single page document after modification in the second by specified information, then correlating them according to the sequence. The specified information can be format information, or can be time information or name information of the document (such as the text or the cover). If correlating according to the cover or the text, proceeding with the one-to-one correlating to the page of the text part or the cover part in the at least one single page document before modification and the page of the text part or cover part in the at least one single page document after modification successively.

104, the page proofreading apparatus compares all of the previews of the single page documents before modification in the first page and the single page documents after modification for those first pages and second pages that correlating with each other according to a pixel element, the pixel element including a pixel value and a gray value of the pixel.

Figure 2:
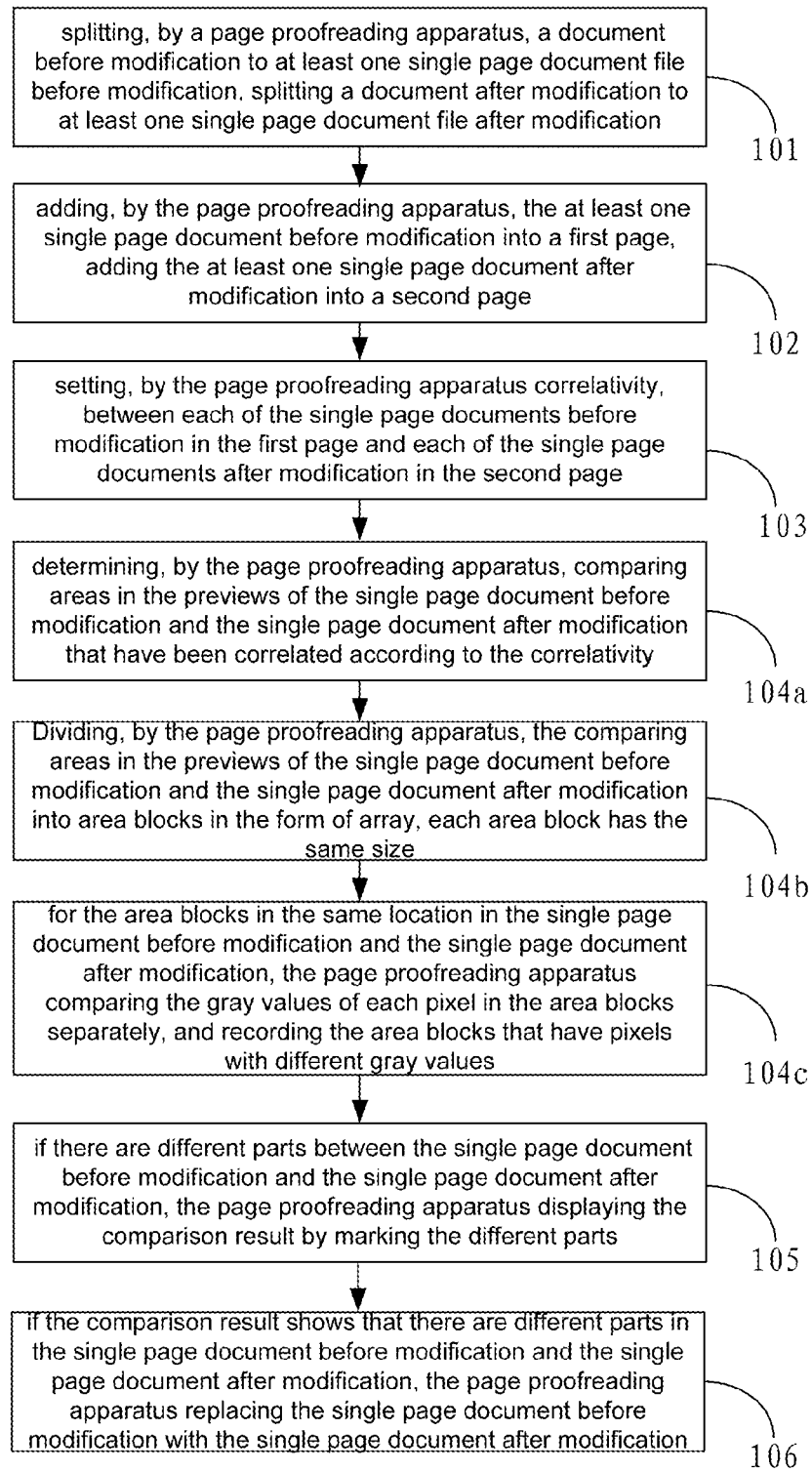
FIG. 2 illustrates another embodiment of the page proofreading method according to the present invention.

Alternatively, as shown in FIG. 2, step 104 further comprising:

104a, the page proofreading apparatus determines comparing areas in the previews of the single page document before modification and the single page document after modification that have been correlated according to the correlativity.

104a1, the page proofreading apparatus compares the pixel values of the previews of the single page document before modification and the single page document after modification that have been correlated according to the correlativity.

Specifically, the present invention proceeds with the comparison based on the gray values of the pixels which have the same pixel coordinates in the previews of the single page document before modification and the single page document after modification that have been correlated according to the correlativity, such that, compares the gray values of the pixels only if the pixel values of the comparing areas in above-mentioned two previews that will be compared are the same, and the size and pixel coordinates locations of each pixel are the same (i.e., the number of pixels are the same). Meanwhile, the resolution ratios of above-mentioned two previews are the same (i.e., there are the same number of pixels in the previews of the same size, and the size of each pixel is the same).

Therefore the comparing areas of above-mentioned two previews can be determined just by comparing the pixel values of above-mentioned two previews, i.e. as described in the following step 104a2.

104a2, if the pixel values of the previews of the single page document before modification and the single page document after modification are the same, sets the whole areas of the previews of the single page document before modification and the single page document after modification as the comparing areas.

If the pixel values of the previews of the single page document before modification and the single page document after modification are not the same, the whole area of the preview having a smaller pixel value and areas, which have the pixel coordinates corresponding to those of the preview having the smaller pixel value, in the preview having a larger pixel value are set as the comparing areas.

Specifically, if the pixel values of the previews of the single page document before modification and the single page document after modification that have been correlated according to the correlativity are the same, the comparing areas are the whole areas of the previews of the single page document before modification and the single page document after modification.

When the pixel values of the previews of the single page document before modification and the single page document after modification that have been correlated according to correlativity are not the same, the comparing areas are, respectively, for the preview that has a smaller pixel value of the above-mentioned previews, the comparing area is the preview; for the preview having a larger pixel value of the above-mentioned previews, the comparing area is a page area that composed of all the pixels having the coordinates corresponding to the coordinates of all the pixels in the preview having the smaller pixel value.

104b, the page proofreading apparatus divides the comparing areas in the previews of the single page document before modification and the single page document after modification into area blocks in the form of array, each area block has the same size.

Further alternatively, step 104b further comprising:

104b1, for the single page document before modification and the single page document after modification, the page proofreading apparatus adds a blank pixel area with a preset width to one side in length direction and/or one side in width direction of the comparing area in the previews, to form a new comparing area.

104b2, the page proofreading apparatus divides the new comparing areas into area blocks in the form of array, each area block has the same size. And the length and width of this area block are preset.

Specifically, the comparing areas in the previews of the single page document before modification and the single page document after modification are divided into area blocks with a preset width and length, forming an array of comparing area blocks. While the width or/and length of the comparing area can be divided by the preset width or/and length of the area blocks, each block in the array has the same size.

While the width or/and length of the comparing area can not be divided by the preset width or/and length of the area blocks, the remainders in the comparing areas will be filled up to form a new column or/and row of the area blocks with the preset size. The blank pixel area stated here is added into the previews in the case of the length or/and width of the comparing area cannot be exactly divided by the preset length or/and width of the area blocks while dividing the comparing areas, and the size of the added blank pixel area is the difference between the preset size of one column or/and one row of the area blocks with the column or/and row of the reminders. In the case that the length of the comparing area cannot be exactly divided by the preset length of the area blocks, one column of the blank pixel area is added into one side in length direction of the comparing area, the length of this added column of the blank pixel area is the difference between the preset length of the area block with the length of the reminder column of the original comparing area in the length direction, so that the added column of the blank pixel area forming a new column of the area blocks together with the reminder column of the original comparing area in the length direction; if the width of the comparing area cannot be exactly divided by the preset width of the area blocks, one row of the blank pixel area is added into one side in width direction of the comparing area, the width of this added row of the blank pixel area is the difference between the preset width of the area block with the width of the reminder column of the original comparing area in the width direction, so that the added row of the blank pixel area forming a new row of the area blocks together with the reminder row of the original comparing area in the width direction; if neither of the length and width of the comparing area cannot be exactly divided by the preset length and width of the area block, one column and one row of the blank pixel area are added into one side in length direction and one side in width direction of the comparing area, the width of this column and the length of the row of the added blank pixel area block can be calculated in the way mentioned above.

So while dividing the comparing areas into area blocks with preset size, benefit from adding the blank pixel areas and forming new area blocks, it is possible to avoid losing the edge parts in the case of the length and width of the comparing areas cannot be exactly divided by the preset length and width of the area blocks.

104c, for the area blocks that are in the same location in the single page document before modification and the single page document after modification, the page proofreading apparatus compares the gray values of each pixel in the area blocks, separately, and records the area blocks that have pixels with different gray values.

Specifically, when the preview is a black and white picture, what stored in the pixel coordinates of the pixel in the preview is gray values of the pixel, the range of gray value is 0-255; when the preview is a color picture, what stored in the pixel coordinates of the pixel in the preview is a RGB value, i.e., this value is composed of the gray values of three colors of red, green and blue, which is represented as (R, G, B), such as (R, G, B)=(100, 255, 50) means the gray value of red is 100, the gray value of green is 255, the gray value of blue is 50; therefore no matter the preview is a black and white picture or a color picture, when comparing the pixels in the area blocks, the all that compared is the gray values stored in the pixel coordinates of the pixels in the preview; what different is that for a black and white picture, what compared is a gray value, whereas for a color picture, what compared is three gray values, and if one of these three gray values is not the same, these two pixels are determined not the same, and then the area block contains the pixel is recorded.

Wherein, if the pixel values of the previews of the single page document before modification and the single page document after modification are not the same, this means, in the preview that has the larger pixel value of above-mentioned previews, other than the page area which is composed of all the pixels having the pixel coordinates corresponding to the coordinates of all the pixels in the preview having the smaller pixel value, the rest area of the page is already a different area, therefore, this area is recorded directly.

105, if there are different parts between the single page document before modification and the single page document after modification, the page proofreading apparatus displays the comparison result by marking the different parts.

Specifically, after compared a certain area block, if pixels with different gray values appeared in the area block, the proofreading apparatus records this area block. For example, creates a blank area as the same as the comparing area after divided, if pixels with different gray values appeared in a certain area block, then marks a "1" in a blank area block corresponding to this area block in the blank area. After finished comparing all of the area blocks, merges the adjacent blank area blocks marked with "1", and displays this merged area block by a red rectangular box, and then displays the red rectangular box to the corresponding area blocks in the single page document before modification and the single page document after modification.

Besides, the page proofreading apparatus also has a function of filtering, it can use a red cross to represent a first page list location corresponding to the single page document before modification and a second page list location corresponding to the single page document after modification where have a red rectangular box appeared, and use a green tick to represent a first page list location corresponding to the single page document before modification and a second page list location corresponding to the single page document after modification where have no red rectangular box appeared. Then the comparison result can be displayed by the filtering function, the filter conditions used for the filtering function can be either of displaying all pages, displaying pages with differences, displaying pages without differences or displaying as a page being processed.

Alternatively, the method further comprising:

106, when the comparison result shows that there are different parts in the single page document before modification and the single page document after modification, the page proofreading apparatus will replace the single page document before modification with the single page document after modification, i.e., the user can select whether to replace the pages with errors according to actual needs.

The page proofreading method provided by the embodiment of the present invention can compare the differences between the single page document before modification page and the single page document after modification page, which have been correlated, according to pixel values of the pixels, gray values of the pixels and the pixel coordinates, avoids manual operations, increases the comparing efficiency of document pages, also can replace the different contents in the page of the single page document before modification with the corresponding content in the page of the single page document after modification.

Figure 3:
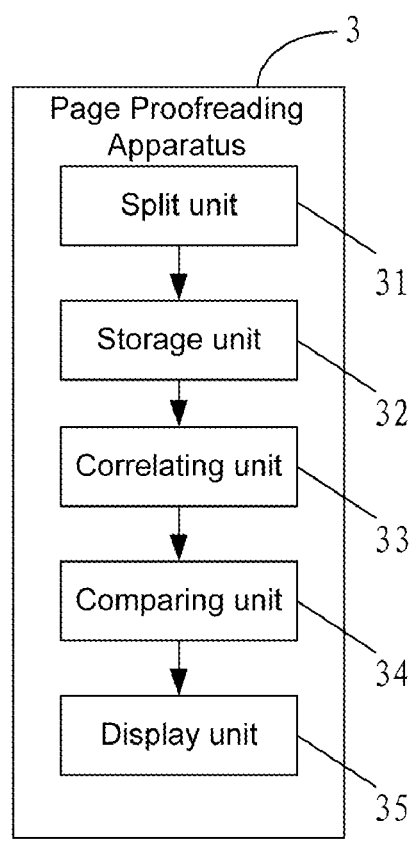
FIG. 3 illustrates a page proofreading apparatus according to embodiment of the present invention.

The embodiment of the present invention provides a page proofreading apparatus, shown as FIG. 3, the page proofreading apparatus comprising: a split unit 31, a storage unit 32, a correlating unit 33, a comparing unit 34 and a display unit 35, wherein:

The split unit 31, configured to split a document before modification to at least one single page document file before modification, split a document after modification to at least one single page document file after modification, each of the single page document files before modification contains: a single page document before modification and a corresponding preview thereof, each of the single page document files after modification contains: a single page document after modification and a corresponding preview thereof.

The storage unit 32, configured to add the at least one single page document before modification split by the split unit 31 into a first page, add the at least one single page document after modification split by the split unit 31 into a second page.

The correlating unit 33, configured to set correlativity between each of the single page documents before modification that is stored in the first page by the storage unit 32 and each of the single page documents after modification that is stored in the second page by the storage unit 32.

The comparing unit 34, configured to compare pixel elements of the previews of the single page document before modification and the single page document after modification for all of the first pages and the second page that correlated with each other, the pixel element including a pixel value and a gray value of the pixel.

A display unit 35, with respect to comparing the single page document before modification and the single page document after modification, if the comparison result gained by the comparing unit 34 shows that there are different parts between them, the display unit 35 displays the comparison result by marking the different parts.

Alternatively, the apparatus further comprising: a replacing unit 36, wherein:

The replacing unit 36, if the comparison result gained by the comparing unit 34 shows that there are the different parts in the single page document before modification and the single page document after modification, the replacing unit 36 replaces the single page document before modification with the single page document after modification.

Further alternatively, the correlating unit is specifically configured to correlate the sequence of adding the at least one single page document before modification into the first page by the storage unit 32 with the sequence of adding the at least one single page document after modification into the second page by the storage unit 32, and set the correlativity between each of the single page documents before modification stored in the first page by the storage unit 32 and each of the single page documents after modification stored in the second page by the storage unit 32.

Or,

Configured to sort the at least one single page document before modification stored in the first page by the storage unit 32 and the at least one single page document after modification stored in the second page by the storage unit 32; correlate the sequence of the at least one single page document before modification in the first page after movement with the sequence of the at least one single page document after modification in the second page after movement, and set the correlativity between each of the single page documents before modification stored in the first page by the storage unit 32 and each single page document after modification stored in the second page by the storage unit 32.

Figure 4:
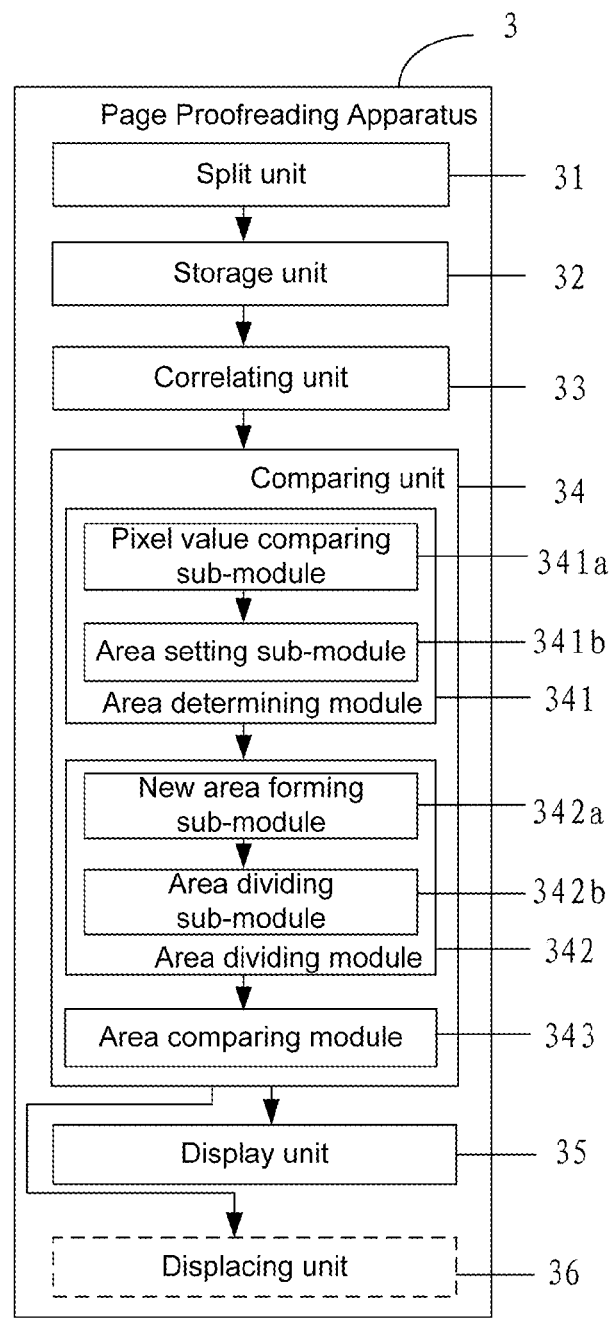
FIG. 4 illustrates another embodiment of the page proofreading apparatus according to the present invention.

Further alternatively, as shown in FIG. 4, the comparing unit 34 comprising: an area determining module 341, an area segmenting module 342 and an area comparing module 343, wherein:

The area determining module 341, configured to determine comparing areas in the previews of the single page document before modification and the single page document after modification that have been correlated according to the correlativity set by the correlating unit 33.

The area dividing module 342, configured to divide the comparing areas, which are determined by the area determining module 341, in the previews of the single page document before modification and the single page document after modification into area blocks in the form of array, each area block has the same size.

The area comparing module 343, for the area blocks that are in the same location in the single page document before modification and the single page document after modification, the area comparing module is configured to compare the gray value of each pixel in the area blocks, and record the area blocks that have pixels having different gray values, wherein the area blocks are divided by the area dividing module 342.

Further alternatively, as shown in FIG. 4, the area determining module 341 further comprising:

A pixel value comparing sub-module 341a, configured to compare pixel values of the previews of the single page document before modification and the single page document after modification, which have been correlated by the correlating unit 33.

An area setting sub-module 341b, if the pixel values of the previews of the single page document before modification and the single page document after modification are the same, which are compared by pixel value comparing sub-module 341a, the area setting sub-module 341b sets the whole areas of the previews of the single page document before modification and the single page document after modification as the comparing areas. Whereas, if the pixel values of the previews of the single page document before modification and the single page document after modification are not the same, which were compared by the pixel value comparing sub-module 341a, the area setting sub-module 341b sets the whole area of the preview having a smaller pixel value and the areas, which have the pixel coordinates corresponding to those of the previews having the smaller pixel values, in the previews having a lager pixel value as the comparing areas.

Further alternatively, as shown in FIG. 4, the area dividing module 342 further comprising:

A new area forming sub-module 342a, for the single page document before modification and the single page document after modification, the new area forming sub-module 342a adds a blank pixel area with a preset width to one side in length direction and/or one side in width direction of the comparing area in the preview, to form a new comparing area, wherein the comparing area is determined by the area determining module 341;

An area dividing sub-module 342b, configured to divide the new comparing area formed by the new area forming sub-module 342a into area blocks in the form of array, each area block has the same size.

The page proofreading apparatus provided by the embodiment of the present invention can compare the difference between the correlated single page document before modification page and the single page document after modification page according to pixel values of the pixels, gray values of the pixels and pixel coordinates, so as to avoids the manual operations, increases the comparing efficiency of comparing the document pages, which also can replace the content in the single page document before modification page with a corresponding different content in a single page document after modification page.

Those ordinary skilled person in the art can understand that: the whole or partial steps to achieve above-mentioned embodiment of the method can be finished by a hardware correlating to program instructions, aforesaid program can be stored in a computer readable storage medium, when the program is executed, the steps included in the above-mentioned embodiment of the method are executed; the aforesaid storage medium comprising: various mediums that can store program codes such as ROM, RAM, disk or optical disk, etc.

Above are only specific embodiments of the present invention, the scope of the present invention is not limited to these, changes or replacements can be easily made by a person skilled in the art within the scope of technology disclosed by the present invention, which should fall into the scope of protection of the present invention. Therefore, the scope of protection of the present invention should be the scope of the claims.

What is claimed is:

1. A page proofreading method, comprising:

Splitting a document before modification to at least one single page document file before modification, splitting a document after modification to at least one single page document file after modification, each of the single page document files before modification contains: a single page document before modification and a corresponding preview thereof, each of the single page document files after modification contains: a single page document after modification and a corresponding preview thereof;

Adding the at least one single page document before modification into a first page, adding the at least one single page document after modification into a second page;

Setting correlativity between each of the single page documents before modification in the first page and each of the single page documents after modification in the second page;

Comparing pixel elements of the previews of the single page document before modification and the single page document after modification that correlated with each other for all of the first pages and the second pages, each of the pixel elements including a pixel value and a gray value of the pixel;

if there are different parts between the single page document before modification and the single page document after modification, displaying the comparison result by marking the different parts.

2. The method according to claim 1, further comprising: when the comparison result shows that there are different parts between the single page document before modification and the single page document after modification, replacing the single page document before modification with the single page document after modification.

3. The method according to claim 1, wherein the step of setting the correlativity between each of the single page documents before modification in the first page and each of the single page documents after modification in the second page further comprises:

correlating a sequence of adding the at least one single page document before modification into the first page with a sequence of adding the at least one single page document after modification into the second page, and setting the correlativity between each of the single page documents before modification in the first page and each of the single page documents after modification in the second page;

or, sorting the at least one single page document before modification in the first page and the at least one single page document after modification in the second page; and correlating an sequence of the at least one single page document before modification in the first page after movement with an sequence of the at least one single page document after modification in the second page after movement, and setting the correlativity between each of the single page documents before modification in the first page and each of the single page documents after modification in the second page.

4. The method according to claim 1, wherein the step of comparing pixel elements of the previews of the single page document before modification in the first page and the single page document after modification in the second page that correlated with each other for all of the first pages and the second pages further comprises:

determining comparing areas in the previews of the single page document before modification and the single page document after modification that have been correlated according to the correlativity;

dividing the comparing areas in the previews of the single page document before modification and the single page document after modification into area blocks in the form of array, each area block has the same size;

comparing gray values for each pixel in the area blocks that are in the same location in the single page document before modification and the single page document after modification, and recording the area blocks that have pixels having different gray values.

5. The method according to claim 4, wherein the step of determining the comparing areas in the previews of the single page document before modification and the single page document after modification that have been correlated according to the correlativity further comprises:

comparing pixel values of the previews of the single page document before modification and the single page document after modification that have been correlated according to the correlativity;

if the pixel values of the previews of the single page document before modification and the single page document after modification are the same, setting the whole areas of the previews of the single page document before modification and the single page document after modification as the comparing areas;

if the pixel values of the previews of the single page document before modification and the single page document after modification are not the same, setting the whole areas of the previews having a smaller pixel value and areas, which have pixel coordinates corresponding to those of the previews having the smaller pixel value, in the previews having a larger pixel value as the comparing areas.

6. The method according to claim 4, wherein the step of dividing the comparing areas in the previews of the single page document before modification and the single page document after modification into area blocks in the form of array, each of the area blocks has the same size further comprises:

for the single page document before modification and the single page document after modification, adding a blank pixel area with a preset width into one side in length direction and/or one side in width direction of the comparing area in the preview, to form a new comparing area;

dividing the new comparing area into area blocks in the form of array, each of the area blocks has the same size.

7. A page proofreading apparatus, comprising:

a split unit, configured to split a document before modification to at least one single page document file before modification, split a document after modification to at least one single page document file after modification, each of the single page document files before modification contains: a single page document before modification and a corresponding preview thereof, each of the single page document files after modification contains: a single page document after modification and a corresponding preview thereof;

a storage unit, configured to add the at least one single page document before modification split by the split unit into a first page, add the at least one single page document after modification split by the split unit into a second page;

a correlating unit, configured to set correlativity between each of the single page documents before modification that is stored in the first page by the storage unit and each of the single page documents after modification that is stored in the second page by the storage unit;

a comparing unit, configured to compare pixel elements of the previews of the single page document before modification and the single page document after modification that have the correlativity set by the correlating unit for all of the first pages and the second pages, the pixel element including a pixel value and a gray value of the pixel;

a display unit, if there are different parts between the single page document before modification and the single page document after modification, configured to display the comparison result by marking the different parts.

8. The apparatus according to claim 7, further comprising:
a replacing unit, if the comparing result obtained by the comparing unit shows that there are different parts between the single page document before modification and the single page document after modification, configured to replace the single page document before modification with the single page document after modification.

9. The apparatus according to claim 7, wherein the correlating unit is specifically configured to: correlate a sequence of adding the at least one single page document before modification into the first page by the storage unit with a sequence of adding the at least one single page document after modification into the second page by the storage unit, and set the correlativity between each of the single page documents before modification stored in the first page by the storage unit and each of the single page documents after modification stored in the second page by the storage unit;

or, configured to sort the at least one single page document before modification stored in the first page by the storage unit and the at least one single page document after modification stored in the second page by the storage unit; correlate the sequence of the at least one single page document before modification in the first page after movement with the sequence of the at least one single page document after modification in the second page after movement, and set the correlativity between each of the single page documents before modification stored in the first page by the storage unit and each of the single page documents after modification stored in the second page by the storage unit.

10. The apparatus according to claim 7, wherein the comparing unit further comprises:
an area determining module, configured to determine comparing areas in the previews of the single page document before modification and the single page document after modification that have been correlated according to the correlativity set by the correlating unit;

an area dividing module, configured to divide the comparing areas in the previews of the single page document before modification and the single page document after modification into area blocks in the form of array, each of the area block has the same size, wherein the comparing areas are determined by the area determining module;

an area comparing module, for the area blocks that are in the same location in the single page document before modification and the single page document after modification, configured to compare gray values for each pixel in the area blocks, and record the area blocks that have pixels having different gray values, wherein the area blocks are divided by the area dividing module.

11. The apparatus according to claim 10, wherein the area determining module further comprises:
a pixel value comparing sub-module, configured to compare pixel values of the previews of the single page document before modification and the single page document after modification, wherein the single page document before modification and the single page document after modification are correlated according to the correlativity set by the correlating unit;

an area setting sub-module, if the pixel values of the previews of the single page document before modification and the single page document after modification are the same, configured to set the whole areas of the previews of the single page document before modification and the single page document after modification as the comparing areas; if the pixel values of the previews of the single page document before modification and the single page document after modification are not the same, configured to set the whole areas of the previews having a smaller pixel value and areas, which have pixel coordinates corresponding to those of the previews having the smaller pixel, in the previews having a larger pixel value as the comparing areas.

12. The apparatus according to claim 10, wherein the area dividing module further comprises:
a new area forming sub-module, for the single page document before modification and the single page document after modification, configured to add a blank pixel area with a preset width into one side in length direction and/or one side in width direction of the comparing area in the previews, to form a new comparing area, wherein the comparing area is determined by the area determining module;

an area dividing sub-module, configured to divide the new comparing area formed by the new area forming sub-module into area blocks in the form of array, each of the area block has the same size.

13. A storage medium that stores a computer program, the computer program comprising instructions which make a processor execute the method according to claim 1.

* * * * *